United States Patent [19]

Peyrucain et al.

[11] Patent Number: 5,925,079
[45] Date of Patent: Jul. 20, 1999

[54] PROCESS AND DEVICE FOR GUIDING A MOBILE CRAFT

[75] Inventors: Eric Peyrucain; Yves Saint Upery, both of Toulouse, France

[73] Assignee: Aerospatiale Societe Nationale Industrielle, Paris, France

[21] Appl. No.: 08/681,977

[22] Filed: Jul. 30, 1996

Related U.S. Application Data

[30] Foreign Application Priority Data

Aug. 10, 1995 [FR] France ................................. 95 09715

[51] Int. Cl.⁶ ........................... G01C 21/00; B64C 19/00
[52] U.S. Cl. ................... 701/4; 701/11; 244/3.21; 244/175
[58] Field of Search .................. 701/3, 4, 11; 244/3.15, 244/3.21, 175, 194

[56] References Cited

U.S. PATENT DOCUMENTS

| | | | |
|---|---|---|---|
| 3,994,456 | 11/1976 | Post et al. ................................. | 244/189 |
| 5,023,796 | 6/1991 | Kahler ................................. | 364/434 |
| 5,646,854 | 7/1997 | Bevan ................................. | 701/206 |

FOREIGN PATENT DOCUMENTS

| | | |
|---|---|---|
| 0036771A2 | 9/1981 | European Pat. Off. . |
| 1133658 | 11/1968 | United Kingdom . |

*Primary Examiner*—Michael Zanelli
*Attorney, Agent, or Firm*—Stevens, Davis, Miller & Mosher, L.L.P.

[57] ABSTRACT

A mobile craft is guided with respect to a trajectory. To guide the craft, the distance xtk is determined between the mobile craft and the point of orthogonal projection of the mobile craft on a segment of the trajectory. The angle tkae is determined between the direction of travel of the mobile craft and the direction at the point of orthogonal projection. A control value is computed for the lateral attitude from the distance and angle, two characteristic coefficients and a nominal control value. This control value is applied to the craft.

28 Claims, 3 Drawing Sheets

PROCESS AND DEVICE FOR GUIDING A MOBILE CRAFT

FIELD OF THE INVENTION

The invention relates to a process for guiding a mobile craft in a horizontal plane along a predefined trajectory.

Although not exclusively, the present invention is particulary well suited to guiding an aircraft, for example a transport plane.

Within the framework of the present invention, said predefined trajectory is formed of adjacent segments which are referred to as straight (namely orthodromy or loxodromy segments) or circular arc-shaped segments and it represents a trajectory which corresponds for example to a flight plan.

The guidance of a mobile craft along such a trajectory presupposes, if the mobile craft is not on said trajectory at the start of the guidance, the deployment of a steering operation intended to bring said mobile craft onto said trajectory. Such a steering operation corresponds, within the framework of the present invention, to capture of the trajectory by the mobile craft, whereas the guidance proper of the mobile craft along a previously captured trajectory is termed following.

DESCRIPTION OF RELATED ART

In a known manner, said operations of capture and following are generally performed by deploying different methods for computing the guidance commands. Furthermore, said guidance commands are usually determined differently depending on whether the segment taken into account on said trajectory corresponds to a straight segment or to a circular arc.

Consequently, the guidance of a mobile craft along a predefined trajectory, performed according to the aforesaid customary method, is particularly complex. Moreover, this guidance is rather inaccurate and it is often deployed, in particular in the case of an aircraft, by means of abrupt maneuvers, especially together with a considerable inclination of the aircraft, this entailing discomfort, in particular for the passengers, and the generation of considerable stresses on said aircraft.

SUMMARY OF THE INVENTION

The object of the present invention is to remedy these drawbacks. It relates to a process for guiding a mobile craft, especially an aircraft, in a horizontal plane, making it possible to capture and follow, in an accurate, simple and non-abrupt manner, a trajectory defined in said horizontal plane and formed of straight and/or circular arc-shaped adjacent segments.

For this purpose, according to the invention, said process is noteworthy in that the following operations are performed repetitively:

the segment of said trajectory with respect to which said mobile craft is to be guided is determined;

the distance xtk is determined between said mobile craft and the orthogonal projection of said mobile craft on the guidance segment thus determined;

the angle tkae is determined between the actual direction of travel of said mobile craft and the fictitious direction of travel which it would have if it were located at said point of orthogonal projection, along said trajectory;

a control value $\Phi c$ is computed for the lateral attitude of the mobile craft from the relation $$\Phi c = \Phi \text{nom} + ((k1 \cdot xtk) + tkae) \cdot k2$$

in which:
k1 and k2 represent characteristic coefficients,
$\Phi$nom represents the nominal value corresponding to the lateral attitude which said mobile craft is required to have in order to follow said determined guidance segment, and
the product $k1 \cdot xtk$ is restricted between two predefined values; and
the control value $\Phi c$ thus computed is applied to said mobile craft as the lateral attitude control.

Thus, the process in accordance with the invention makes it possible both to capture and follow the trajectory, for both a straight segment and a circular arc, thus making it possible to obtain the desired guidance by deploying one and the same string of operations, regardless of the relevant phases of guidance.

Moreover, the control value $\Phi c$ is computed in such a way that the angle of return to the trajectory does not exceed a predetermined value, preferably 45°, by restricting the product $k1 \cdot xtk$ for this purpose.

The present invention thus allows non-abrupt and accurate guidance even in a considerable wind in respect of straight guidance segments.

According to the invention, in order to determine said guidance segment, advantageously:

a) upon initial deployment of the process, an initial segment is determined as guidance segment; then b) the following operations are performed repetitively:

a first vector is determined defined between said mobile craft and the final point of the current guidance segment in the direction of travel over said trajectory a second vector is determined, defined at said final point along the direction of travel over the trajectory;

the scalar product of said first and second vectors is computed; and if said scalar product is greater than or equal to zero, said current guidance segment is still regarded as guidance segment, otherwise the segment situated downstream, in the direction of travel over the trajectory, of said current guidance segment is regarded as guidance segment.

However, when said current segment is a circular arc-shaped segment of angle greater than 180°, the aforesaid step b) is advantageously interrupted until the angle along the arc between said orthogonal projection and the final point of said segment becomes less than 180°.

Furthermore, according to the invention, the characteristic coefficients k1 and k2 are advantageously computed from the following relations:

$$k1 = \frac{w}{2 \cdot \xi \cdot V} \qquad k2 = \frac{-2 \cdot \xi \cdot w \cdot V}{g}$$

in which:
g represents the acceleration due to gravity,
V represents the speed of the mobile craft,
$\xi$ represents a damping term, and
w represents the pulsatance at the resonant frequency.

Of course, with regard to said terms $\xi$ and w, values determined by a person skilled in the art on the basis of theory and practice may be used to deploy the invention. However, according to the invention, to obtain the most advantageous values for a specified mobile craft, in a preliminary step, a plurality of guidances with different terms are preferably performed and the values for which capture and following of the trajectory are performed optimally, with respect to predefined conditions, are used for the deployment of the process, advocating for example rapid and/or non-abrupt capture, or the generation of predefined restricted stresses on the mobile craft.

Moreover, advantageously, for a guidance segment corresponding to a circular arc, the nominal value Φnom is computed from the relation:

$$\tan(\Phi\text{nom}) = (V^2)/(Rj \cdot g)$$

tan(Φnom) being the tangent of the nominal value Φnom, V being the speed of the mobile craft, Rj the radius of curvature of said circular arc and g the acceleration due to gravity, and, for a straight guidance segment, said nominal value Φnom is regarded as zero.

Of course, for a circular arc, the nominal value Φnom which depends on the speed V of the mobile craft over the trajectory, can be computed during each computation of the control value Φc.

However, the present invention provides for other embodiments.

Thus, in an advantageous embodiment of the invention, the nominal value Φnom is computed only once for a relevant guidance segment and relevant speed of the mobile craft and the nominal value thus computed is used during each computation relating to this guidance segment, whereas, in another particularly advantageous embodiment, the nominal value $\Phi_{nom}$ is computed with each computation of the control value $\Phi_c$ and at least during each change in the speed V of the mobile craft, thus using the new value of said speed V, which entails a generally restricted number of computations while making it possible to obtain a result of sufficient accuracy.

Moreover, in order that the mobile craft does not come too abruptly, that is to say too directly, onto the trajectory during a capture, advantageously, the computed control value $\Phi_c$ is applied to said mobile craft progressively, according to an at least second order law of variation.

Preferably, in order to determine said progressive value to be applied to the mobile craft on the basis of a computed control value:

said computed control value is restricted;

the second derivative with respect to time of said restricted value is computed;

said second derivative is restricted; and a double integration with respect to time of said restricted second derivative is performed so as to obtain said progressive value to be applied to the control.

The value thus determined by the process in accordance with the invention can be transmitted to various user devices. Of course, when said mobile craft is an aircraft furnished with an automatic pilot, advantageously, the computed control value $\Phi_c$ is applied, possibly progressively, directly to said automatic pilot of said aircraft.

The present invention also relates to a device for deploying of the aforesaid process.

According to the invention, said device is noteworthy in that it includes a first computing unit capable of determining the current guidance segment and furthermore comprising:

a first computer capable of determining the distance xtk, and a second computer capable of determining the angle tkae; and a second computing unit connected to said first computing unit and capable of computing the control value $\Phi_c$ of the lateral attitude and advantageously comprising for this purpose:

a first computer capable of computing the product k1.xtk;

a second computer capable of restricting the computed value delivered by the first computer;

a third computer capable of computing the sum of the value of the angle tkae and of the results delivered by the second computer;

a fourth computer capable of computing the product between the value k2 and the results delivered by the third computer;

a fifth computer capable of computing the nominal value Φnom; and a central computer connected to said fourth and fifth computers and capable of computing the control value Φc of the lateral attitude of the mobile craft.

Moreover, the device in accordance with the invention can advantageously include an auxiliary computing means making it possible to determine, from the computed control value Φc, according to an at least second degree law of variation, the progressive value to be applied to the control of the lateral attitude of the mobile craft.

BRIEF DESCRIPTION OF THE DRAWINGS

The figures of the appended drawing will elucidate the manner in which the invention may be embodied. In these figures, identical references designate similar elements.

DETAILED DESCRIPTION OF THE PREFERRED EMBODIMENT

Figure 1:
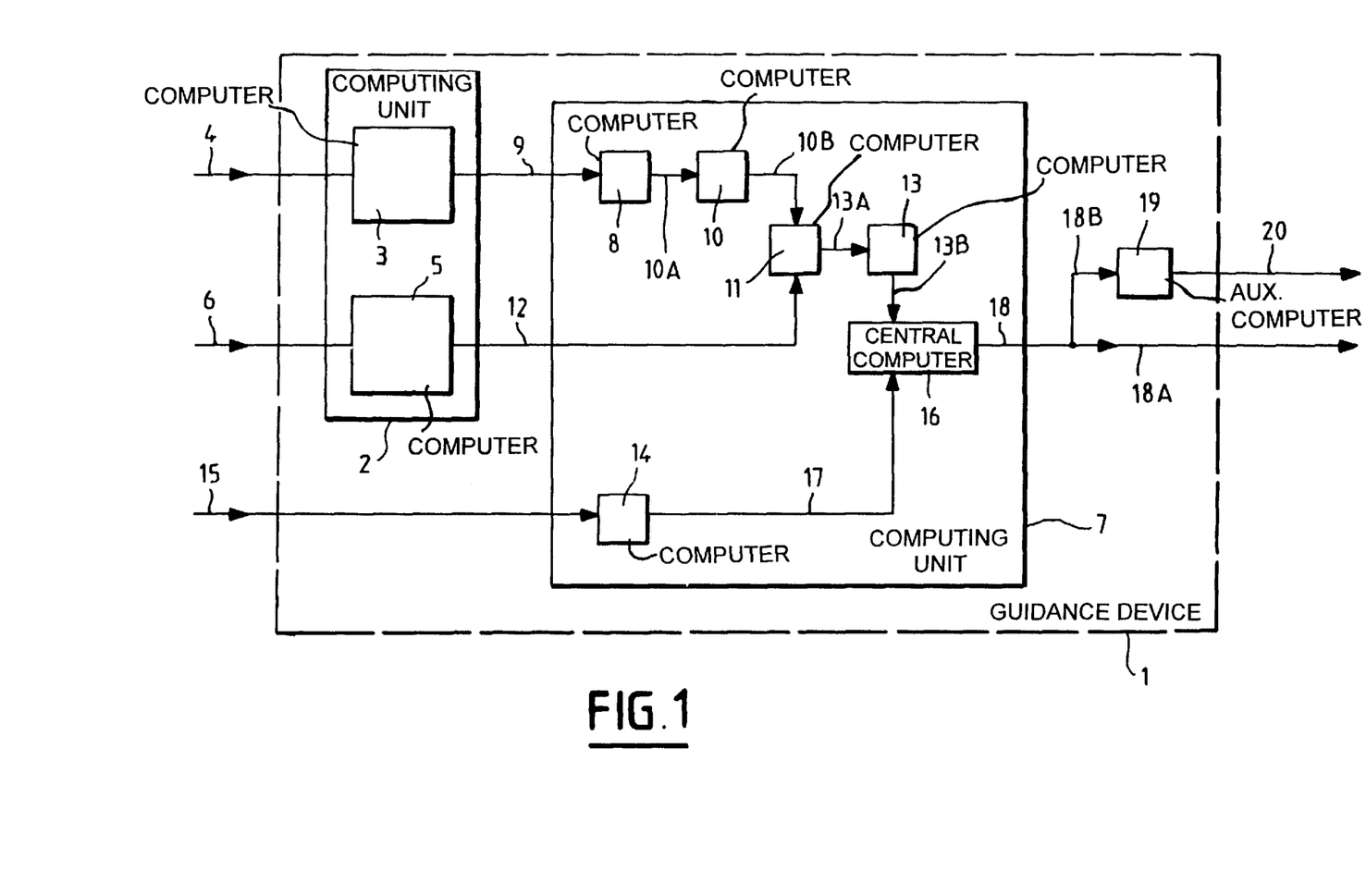
FIG. 1 is the block diagram of the device in accordance with the invention.

The device 1 in accordance with the invention and represented diagrammatically in FIG. 1 is intended to be carried on board a mobile craft, represented in the form of an aircraft M in FIGS. 2 to 5, in such a way as to allow the guidance of said mobile craft in a horizontal plane along a predefined trajectory.

Figure 2:
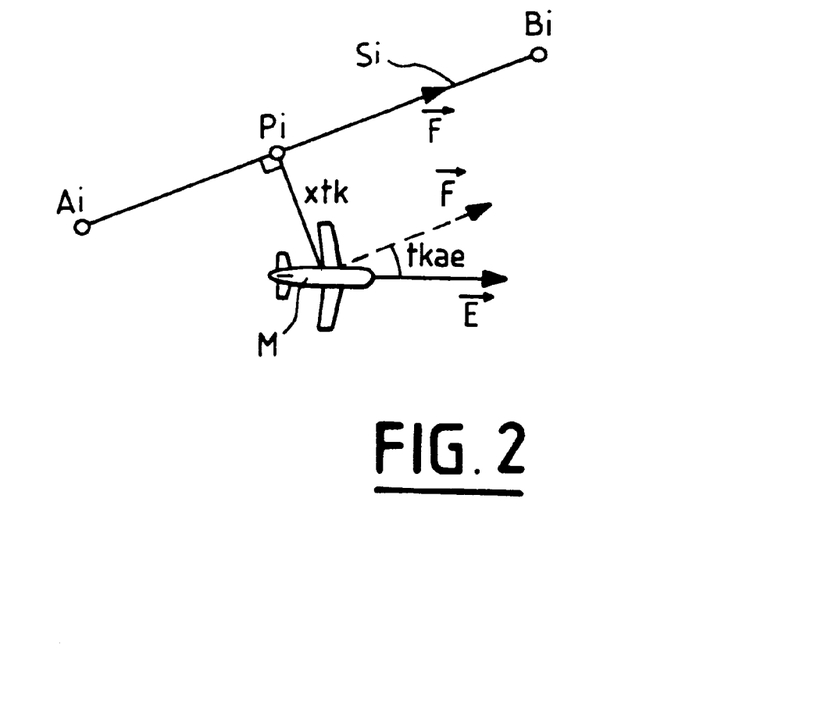
FIG. 2 illustrates diagrammatically the guidance of a mobile craft in accordance with the invention with respect to a straight segment.
Figure 3:
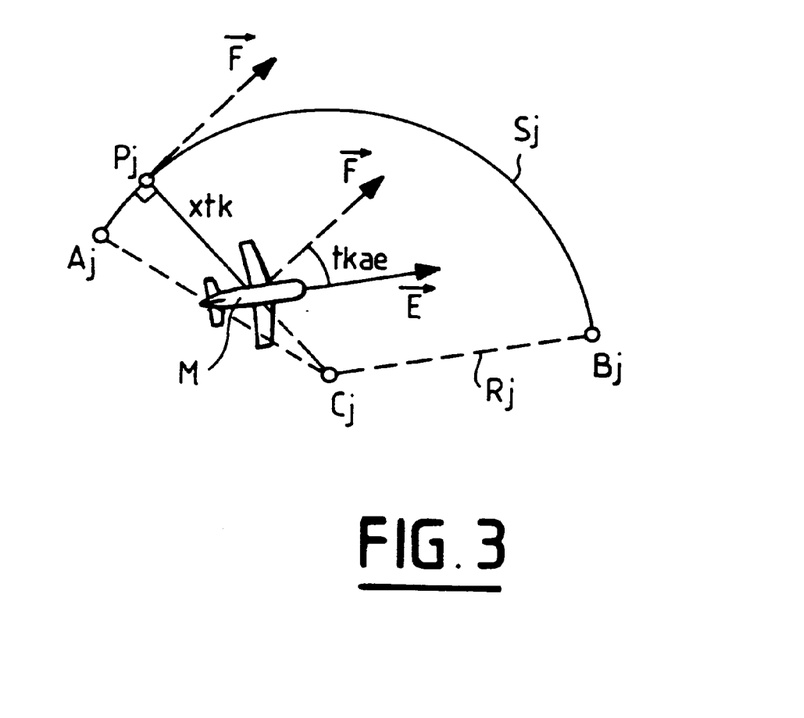
FIG. 3 illustrates diagrammatically the guidance of a mobile craft in accordance with the invention with respect to a circular arc.

Within the framework of the present invention, this predefined trajectory is formed of straight segments Si and circular arcs Sj joined together, such as shown separately in FIGS. 2 and 3 respectively.

Depending on the position at the start of the guidance of said mobile craft M with respect to said trajectory, the envisaged guidance is performed, either on the basis of the following two phases, or solely on the basis of the latter of said phases, which are:

a phase of capture intended to bring said mobile craft M onto said trajectory, and a phase of following making it possible to move said mobile craft M situated on said trajectory along the latter.

The known methods for performing such guidance exhibit rather unsatisfactory accuracy and generally require different operations, in particular different ways of computing the guidance commands, for capture and following, and likewise often require different operations depending on whether the relevant segment of said trajectory is a straight segment or a circular arc, so that said customary guidance methods are generally very complex.

The present invention relates to a very accurate guidance process deployed by said device 1, making it possible to remedy these drawbacks.

For this purpose, according to the invention, in order to perform such guidance:

the segment of said trajectory with respect to which the mobile craft M is to be guided is determined. It is therefore, either a straight segment Si with initial point Ai and final point Bi, such as represented in FIG. 2, or a circular arc Sj, with center Cj, initial point Aj, final point Bj and radius of curvature Rj, such as represented in FIG. 3;

the distance xtk is determined between said mobile craft M and the orthogonal projection Pi or Pj of said mobile craft M on the guidance segment Si or Sj previously determined;

the angle tkae is determined between the actual direction of travel $\vec{E}$ of said mobile craft M and the fictitious direction of travel $\vec{F}$ which it would have if it were located at said point of orthogonal projection Pi or Pj, along said trajectory. For a straight segment Si, said fictitious direction $\vec{F}$ is parallel to said segment Si, whereas, for a circular arc Sj it corresponds to the tangent at the point Pj of said circular arc Sj;

a value Φc is computed for the lateral attitude of the mobile craft M from the relation $$\Phi c = \Phi_{nom} + ((k1.xtk) + tkae0).2 \quad (1)$$

in which:

k1 and k2 represent characteristic coefficients specified below, $\Phi_{nom}$ represents the nominal value corresponding to the lateral attitude which said mobile craft M is required to have in order to follow said determined guidance segment, and the product k1.xtk is restricted between two predefined values, preferably between plus and minus 45°; and the value Φc thus computed is applied to said mobile craft M as lateral attitude control, preferably after having modified it in the manner indicated below.

For the deployment of this process, the device 1 in accordance with the invention furthermore includes:

a computing unit 2 capable of determining the current guidance segment and comprising:

a computer 3 receiving information via a link 4 and capable of determining the distance xtk, in a manner known by a person skilled in the art and not specified in the present description; and a computer 5 receiving information via a link 6 and capable of determining the angle tkae, also in a known manner not specified here; and a computing unit 7 connected to said computing unit 2, such as specified below, and capable of computing the value Φc of the lateral attitute.

For this purpose, said computing unit 7 includes: a computer 8 connected via a link 9 to said computer 3 and capable of computing the product k1.xtk, the distance xtk being received from said computer 3 and the coefficient k1 being computed from the expression:

$$k1 = \frac{w}{2 \cdot \xi \cdot V}$$

in which:

w is the pulsatance at the resonant frequency,

ξ is a damping term, and

V is the speed of the mobile craft M;

a computer 10 connected via a link 10A to said computer 8 and capable of restricting the computed value delivered by this computer 8, preferably between plus and minus 45°;

a computer 11 connected to the computers 5 and 10 respectively via links 12 and 10B and capable of computing the sum of the results delivered by the computers 5 and 10, namely the expression (k1.xtk)+tkae;

a computer 13 connected to the computer 11 by a link 13A, receiving the results of its processing operations and capable of computing the expression ((k1.xtk)+tkae).k2, the coefficient k2 being computed from the expression:

$$k2 = -(2.\xi.w.V)/g$$

in which, in addition to the aforesaid elements, g represents the acceleration due to gravity;

a computer 14 receiving information via a link 15 and capable of computing the nominal value Φnom, such as specified hereafter; and a central computer 16 connected to said computers 13 and 14 respectively via links 13B and 17 and capable of computing the control value Φc for the lateral attitude of the mobile craft M by means of the aforesaid expression (1).

It will be noted that the value Φnom, which corresponds to the lateral attitude which the mobile craft M is required to have in order to follow a determined captured guidance segment, such as indicated previously:

is regarded as zero, for a straight guidance segment Si, this being obvious since the mobile craft is in this case required to travel in a straight line; and is computed from the expression:

$$\tan(\Phi nom) = (V^2)/(Rj.g)$$

for a circular arc Sj with radius of curvature Rj, tan (Φnom) being the tangent of Φnom.

Depending on the operating conditions, several different embodiments may be deployed in accordance with the invention in order to compute said nominal value Φnom.

In a first embodiment, the computer 14 computes said nominal value Φnom during each determination of the value Φc, whereas, in a second simplified embodiment, said computer 14 performs the computation only once per guidance segment for a given speed of the mobile craft, this of course facilitating the deployment of the process in accordance with the invention and being justified by the capacity of the processing operations to correct occasional deviations.

However, such an assumption of constancy does not always hold true in practice. This is because, since the speed is capable of varying during guidance, the aforesaid expression for the nominal value Φnom for a circular arc Sj is itself also capable of varying.

In order to take this possibility of variation into account, in a third particularly advantageous embodiment, the nominal value Φnom is computed during each change in the speed V transmitted to the computer 14 by the link 15 which is connected for this purpose to a device, not represented, for measuring the speed of the mobile craft M.

The central computer 16 can transmit the computed value $\Phi c$, via a branch 18A of a link 18 split into two branches 18A and 18B, to a user device, not represented, in particular to an automatic pilot when the mobile craft is an aircraft furnished with such an automatic pilot. The latter then directs said aircraft in accordance with the value of the lateral attitude which has been transmitted to it.

The process and the device 1 in accordance with the invention have numerous advantages, in particular:

the guidance performed is very accurate;

the device 1 can be associated with an aircraft automatic pilot; and the same method, in particular the same expression (1) for computing $\Phi c$, is used both to capture and to follow the trajectory, irrespective of whether the guidance segment is a straight segment Si or a circular arc Sj, thus enormously simplifying the guidance.

In order to demonstrate clearly the accuracy of the present invention, it is shown hereafter in the example of an aircraft M that the expression (1) used according to the invention to compute $\Phi c$ is valid both for a straight segment Si and for a circular arc Sj, as indicated earlier.

Firstly, for a straight segment Si, such as represented in FIG. 2, the inclination $\Phi$ of the aircraft M is defined, in accordance with known equations of flight mechanics, from the expression $$\tan\Phi = (wa.V)/g$$

in which, in addition to the aforesaid elements g and V, wa represents the speed of rotation of the aircraft about its center of turn, which is not represented.

Since by assumption the guidance segment Si is straight, we have the following equality:

$$wa = tkae'$$

tkae' being the derivative with respect to time of the aforesaid angle tkae.

From this it is deduced that:

$$tkae' = (g/V).tg\phi$$

Since the inclination $\Phi$ is equal to at most 30°, by virtue of the restrictions imposed in particular by the automatic pilot, the following approximation is obtained:

$$\tan\Phi \approx \Phi$$

so that:

$$tkae' = (\Phi.g)/V \quad (2)$$

Furthermore, the derivative xtk' with respect to time of the distance xtk satisfies the relation:

$$xtk' = V.\sin(tkae)$$

Since the angle tkae is less than 45°, the following approximation may be assumed:

$$\sin tkae \approx tkae$$

which makes it possible to adopt the relation:

$$xtk' = V.tkae \quad (3)$$

From said expressions (2) and (3), the following system is deduced, defined according to Laplace notation:

$$\begin{cases} tkae = \dfrac{1}{p} \cdot \left(\dfrac{g}{V} \cdot \Phi\right) \\ xtk = \dfrac{1}{p^2} \cdot (g \cdot \Phi) \end{cases} \quad (4)$$

Furthermore, in accordance with a classical result from mathematics, in order to determine a parameter $\Phi c$ from two variable parameters xtk and tkae, it is necessary to use a law of the type:

$$\Phi c = c1.xtk + c2.tkae \quad (5)$$

with c1 and c2 two characteristic coefficients.

Since, moreover, we have the equality $\Phi c = \Phi$ by virtue of the inertia of the aircraft, the aforesaid system (4) yields the following expression, in Laplace notation:

$$\Phi = c1 \cdot \dfrac{1}{p^2} \cdot (g \cdot \Phi) + c2 \cdot \dfrac{1}{p} \cdot \left(\dfrac{g}{V} \cdot \Phi\right)$$

which makes it possible to obtain the equation:

$$p^2 - \left(c2 \cdot \dfrac{g}{V}\right) \cdot p - c1 \cdot g = 0$$

By comparing this last equation to a second degree equation of the type:

$$p^2 + 2.\xi.w.p + w^2 = 0$$

with $\xi$ a damping term and w the pulsatance at the resonant fequency, the following values of the coefficients c1 and c2 are obtained:

$$\begin{cases} c1 = \dfrac{-w^2}{g} \\ c2 = \dfrac{-2 \cdot \xi \cdot w \cdot V}{g} \end{cases} \quad (6)$$

Said expressions (5) and (6) make it possible to recover the expression (1) used in the process in accordance with the invention to compute $\Phi c$, by presupposing that the nominal value $\Phi nom$ is zero and that k1=c1/c2 and k2=c2.

Secondly, this expression (1) will be verified for a guidance segment corresponding to a circular arc Sj, such as represented in FIG. 3.

If the aircraft M is stabilized in respect of turning on said circular arc Sj, then the following expression holds:

$$\tan(\Phi nom) = (wnom.V)/g$$

wnom being the angular speed of the aircraft M on said circular arc of radius Rj, which is defined by wnom=V/Rj.

Under the present assumption, the speed of rotation wa of the aircraft M can be written:

$$wa = wnom + tkae'$$

The expression $\tan\Phi = (wa.V)/g$ can then be written:

$$\tan\Phi = \frac{wnom \cdot V}{g} + \frac{tkae' \cdot V}{g} = \tan(\Phi nom) + \frac{tkae' \cdot V}{g}$$

Since, moreover, $\tan\Phi = \Phi$ and $\tan(\Phi nom) = \Phi nom$, enlisting the same assumptions as before, the following relation is obtained:

$$tkae' = (g/V).(\Phi - \Phi nom)$$

which makes it possible to deduce, taking into account the previous expression (3) which still holds, the following system, in Laplace notation:

$$\begin{bmatrix} tkae = \frac{1}{p} \cdot \left(\frac{g}{V} \cdot (\Phi - \Phi nom)\right) \\ xtk = \frac{1}{p^2} \cdot (g \cdot (\Phi - \Phi nom)) \end{bmatrix} \quad (4)$$

from which system it is possible finally to deduce:
enlisting the same assumptions as for the straight segment Si; and
putting, $\Phi c = (\Phi - \Phi nom)$, the expression:

$$\Phi c = c1.xtk + c2.tkae + \Phi nom \quad (7)$$

with $c1 = (-w^2)/g$
and $c2 = (-2.\xi.w.V)/g$

Thus, this formula (7) for computing $\Phi c$ applies both to a straight segment Si and to a circular arc Sj.

Said formula (7) can be written in the form:

$$\Phi c = \Phi nom + c2 \cdot \left(tkae + \frac{c1}{c2} \cdot xtk\right)$$

and makes it possible to recover the expression (1) on putting $k1 = c1/c2$ and $k2 = c2$.

Moreover it will be noted that, in respect of the terms $\xi$ and w, values advocated by theory and practice can be used.

However, to obtain the most advantageous values for a specified mobile craft, as well as for specified guidance conditions, according to the invention, in a preliminary step, a plurality of guidances with different terms are performed and the values for which capture and following of the trajectory are performed optimally, with respect to pre-defined conditions, are used for the deployment of the process. This preliminary step can be carried out in the form of simulations or in the form of actual guidances, for example under real flight conditions for an aircraft.

In order to avoid overly abrupt changes of direction of the aircraft M, which are disadvantageous for the comfort of the passengers and which entail high stresses on said aircraft M, the computed value $\Phi c$ of the lateral attitude is applied progressively to the control members of the aircraft, and more precisely in accordance with an at least second degree law of variation.

For this purpose, the device 1 in accordance with the invention includes an auxiliary computing means 19 connected to the branch 18B of the link 18 on the output side of the central computer 14 and intended to determine, from the computed value $\Phi c$, the progressive value to be applied to the control of the lateral attitude of the mobile craft M.

According to the invention, in order to determine said progressive value to be applied, said computer 19 performs the following operations:

it restricts the computed value $\Phi c$;
it computes the second derivative with respect to time of said restricted value;
it restricts said second derivative; and
it performs a double integration with respect to time of said restricted second derivative in such a way as to obtain said progressive value increasing over time.

Said auxiliary computing means 19 can transmit this progressive value via a link 20 to a user device, in particular to the automatic pilot in the case of an aircraft furnished with such an automatic pilot.

The device 1 in accordance with the invention also includes a means, not represented, which is integrated for example into the computing unit 2 and makes it possible to determine a change of guidance segment over said pre-defined trajectory, that is to say a change of the segment to be taken into account for the deployment of the guidance.

For this purpose, according to the invention, the scalar product of two vectors $\vec{V1}$ and $\vec{V2}$ defined below is computed and it is deemed that a change of guidance segment should be performed when this scalar product becomes negative. In such a case, the segment situated downstream, in the direction of travel over the trajectory, of the segment for which said scalar product has become negative, is regarded as guidance segment.

Figure 4:
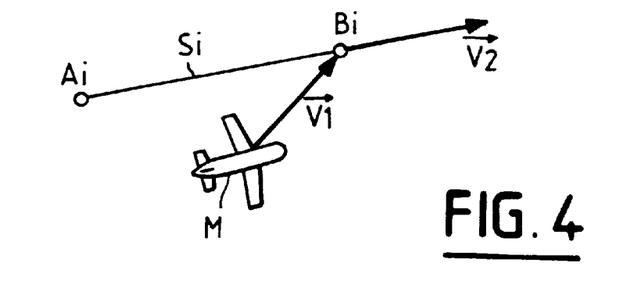
FIG. 4 shows the determination of the guidance segment from a straight segment.
Figure 5:
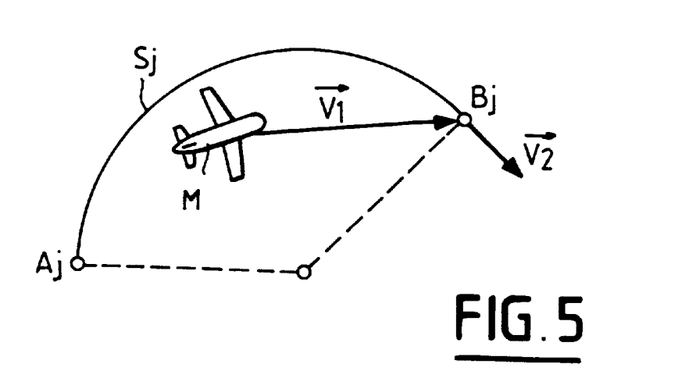
FIG. 5 shows the determination of the guidance segment in respect of a trajectory in the form of a circular arc, the angle of which is less than 180°.

According to the invention, the vector $\vec{V1}$ is formed between said mobile craft M and the final point Bi or Bj of the relevant guidance segment Si or Sj and the vector $\vec{V2}$ is formed at said final point Bi or Bj in the direction of travel over the trajectory at this point Bi or Bj, as represented in FIGS. 4 and 5 for a straight segment Si and a circular arc Sj respectively.

Figure 6:
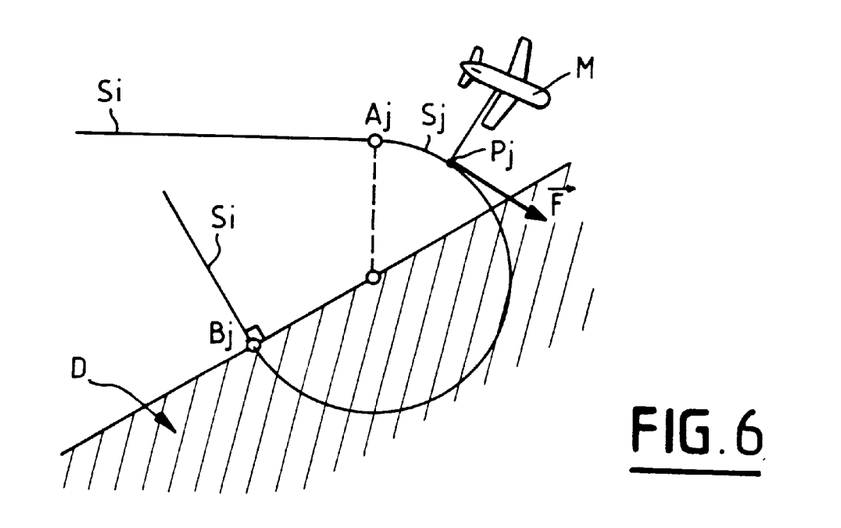
FIG. 6 shows the determination of the guidance segment in respect of a trajectory in the form of a circular arc, the angle of which is greater than 180°.

Additionally, according to the invention, when said guidance segment is a circular arc-shaped segment Sj of angle greater than 180°, such as represented in FIG. 6, the computation of said scalar product, and hence the aforesaid method, is interrupted until the angle along the arc between the orthogonal projection Pj of the mobile craft M and the final point Bj of said segment Sj becomes less than 180°.

Consequently, in the example represented in FIG. 6, the aforesaid method is deployed, for the circular arc Sj, only when the mobile craft M is situated in the hatched part D.

The non-limiting example embodiment described earlier clearly demonstrates the numerous advantages of the present invention.

Of course, within the framework of the present invention, the aforesaid process can be deployed by a single computer or by any other suitable computing architecture.

We claim:

1. A process for guiding a mobile craft in a horizontal plane in order to capture and follow a trajectory defined in said horizontal plane and formed of adjacent segments, the process comprising:
   (a) determining a guidance segment from among said adjacent segments of said trajectory with respect to which said mobile craft is to be guided;
   (b) determining a distance xtk between said mobile craft and a point of orthogonal projection of said mobile craft on the guidance segment determined in step (a);
   (c) determining an angle tkae between an actual direction of travel ($\vec{E}$) of said mobile craft and a fictitious direction of travel ($\vec{F}$) which said mobile craft would have if said mobile craft were located at said point of orthogonal projection along said trajectory;

(d) computing a control value Φc for a lateral attitude of the mobile craft from a relation $$\Phi c = \Phi nom + ((k1.xtk) + tkae).k2$$

in which:
k1 and k2 represent characteristic coefficients,
Φnom represents a nominal value corresponding to the lateral attitude which said mobile craft is required to have in order to follow said guidance segment, and
k1.xtk is restricted between two predefined values; and (e) applying the control value Φc computed in step (d) to said mobile craft to control the lateral attitude.

2. The process as claimed in claim 1, wherein step (d) comprises computing the characteristic coefficients k1 and k2 from the following relations:

$$k1 = \frac{w}{2 \cdot \xi \cdot V} \qquad k2 = \frac{-2 \cdot \xi \cdot w \cdot V}{g}$$

in which:
g represents an acceleration due to gravity,
V represents a speed of the mobile craft,
ξ represents a damping term, and
w represents a pulsatance at a resonant frequency.

3. The process as claimed in claim 2, wherein, in order to specify values of ξ and w, in a preliminary step, a plurality of guidances with different values of ξ and w are performed, and the values for which capture and following of the trajectory are performed optimally, with respect to pre-defined conditions, are used.

4. The process as claimed in claim 1, wherein:
when the guidance segment is a circular arc, the nominal value Φnom is computed from the relation:

$$\tan(\Phi nom) = (V^2)/(Rj \cdot g)$$

tan(Φnom) being a tangent of the nominal value Φnom, V being a speed of the mobile craft, Rj being a radius of curvature of said circular arc and g being an acceleration due to gravity; and when the guidance segment is straight, said nominal value Φnom is regarded as zero.

5. The process as claimed in claim 4, wherein the nominal value Φnom is computed only once for each guidance segment and each speed V of the mobile craft, and wherein the nominal value Φnom thus computed is used during each computation relating to said each guidance segment.

6. The process as claimed in claim 4, wherein the nominal value Φnom is computed with each computation of the control value Φc and at least during each change in a speed V of the mobile craft, thus using each new value of said speed V.

7. The process as claimed in claim 1, wherein the computed control value Φc is applied to the mobile craft progressively, according to an at least second order law of variation.

8. The process as claimed in claim 7, wherein, in order to determine a progressive value to be applied to said mobile craft in accordance with the computed control value Φc:
said computed control value is restricted to obtain a restricted value;
a second derivative with respect to time of said restricted value is computed;
said second derivative is restricted to obtain a restricted second derivative; and
a double integration with respect to time of said restricted second derivative is performed so as to obtain said progressive value.

9. A device for deploying the process set forth in claim 1, wherein said device comprises:
a first computing unit for determining the current guidance segment the first computing unit comprising:
a first computer for determining the distance xtk, and
a second computer for determining the angle tkae; and
a second computing unit connected to said first computing unit for computing the control value Φc of the lateral attitude.

10. The device as claimed in claim 9, wherein said second computing unit includes:
a third computer for computing the product k1.xtk;
a fourth computer for restricting the product computed by the third computer to obtain a restricted product;
a fifth computer a computing a sum of the value of the angle tkae and the restricted product;
a sixth computer for computing a product between the value k2 and the sum computed by the fifth computer;
a seventh computer for computing the nominal value Φnom; and
a central computer connected to said sixth and seventh computers for computing the control value Φc of the lateral attitude of the mobile craft.

11. The device as claimed in claim 9, wherein:
the computed control value Φc is applied to the mobile craft progressively according to an at least second order law of variation; and
the device further comprises an auxiliary computing means for determining, from the computed control value Φc, according to said at least second degree law of variation, the progressive value to be applied to the control of the lateral attitude of the mobile craft.

12. The device as claimed in claim 11, wherein, in order to determine the progressive value to be applied to said mobile craft in accordance with the computed control value Φc:
said computed control value is restricted to obtain a restricted value;
a second derivative with respect to time of said restricted value is computed;
said second derivative is restricted to obtain a restricted second derivative; and
a double integration with respect to time of said restricted second derivative is performed so as to obtain said progressive value.

13. A device for deploying the process set forth in claim 1, said device comprising computing means for performing steps (a)–(e).

14. The process as claimed in claim 1, wherein the mobile craft is an aircraft.

15. The process as claimed in claim 14, wherein said aircraft is furnished with an automatic pilot, and wherein the computed control value Φc is applied directly to said automatic pilot of said aircraft.

16. The process as claimed in claim 15, wherein the computed control value Φc is applied progressively to the automatic pilot of the aircraft.

17. The process as claimed in claim 1, wherein the adjacent segments comprise straight segments, circular arc-shaped segments, or both straight and circular arc-shaped segments.

18. The process as claimed in claim 1, wherein steps (a)–(e) are performed repetitively.

19. The process as claimed in claim 18, wherein step (a) comprises:
(i) upon initial deployment of the process, determining an initial segment as the guidance segment; then
(ii) performing the following operations repetitively to derive a new guidance segment from a current guidance segment:
(A) determining a first vector ($\vec{V1}$) between said mobile craft and a final point of the current guidance segment in a direction of travel over said trajectory;
(B determining a second vector ($\vec{V2}$) at said final point along the direction of travel over the trajectory;
(C) computing a scalar product of said first and second vectors ($\vec{V1}$, $\vec{V2}$); and
(D) if said scalar product is greater than or equal to zero, retaining said current guidance segment as said new guidance segment; and
(E) if said scalar product is less than zero; selecting a segment situated downstream, in the direction of travel over the trajectory, from said current guidance segment to be said new guidance segment.

20. The process as claimed in claim 19, wherein, when said current segment is a circular arc-shaped segment of angle greater than 180°, step (ii) is interrupted until an angle along the circular arc-shaped segment between said point of orthogonal projection and the final point of said segment becomes less than 180°.

21. A device for deploying a process for guiding a mobile craft, in a horizontal plane in order to capture and follow a trajectory defined in said horizontal plane and formed of adjacent segments, wherein the device performs the following operational steps:
(a) determining a guidance segment from among said adjacent segments of said trajectory with respect to which said mobile craft is to be guided;
(b) determining a distance xtk between said mobile craft and a point of orthogonal projection of said mobile craft on the guidance segment determined in operational step (a);
(c) determining an angle tkae between an actual direction of travel ($\vec{E}$) of said mobile craft and a fictitious direction of travel ($\vec{F}$) which said mobile craft would have if said mobile craft were located at said point of orthogonal projection along said trajectory;
(d) computing a control value Φc for a lateral attitude of the mobile craft from a relation Φc=Φnom+((k1·xtk)+tkae)≠k2 in which:
k1 and k2 represent characteristic coefficients,
Φnom represents a nominal value corresponding to the lateral attitude which said mobile craft is required to have in order to follow said guidance segment, and
k1·xtk is restricted between two predefined values; and
(e) applying the control value Φc computed in operational step (d) to said mobile craft to control the lateral attitude;
wherein the computed control value Φc is applied to the mobile craft progressively, according to an at least second order law of variation;
said device comprising:
a first computing unit for determining the current guidance segment the first computing unit comprising:

a first computer for determining the distance xtk, and a second computer for determining the angle tkae;
a second computing unit connected to said first computing unit for computing the control value Φc of the lateral attitude; and
an auxiliary computing means for determining, from the computed control value Φc, according to said at least second degree law of variation, the progressive value to be applied to the control of the lateral attitude of the mobile craft.

22. The device as claimed in claim 21, wherein the mobile craft is an aircraft.

23. The device as claimed in claim 21, wherein the adjacent segments comprise straight segments, circular arc-shaped segments, or both straight and circular arc-shaped segments.

24. The device as claimed in claim 21, wherein operational steps (a)–(e) are performed repetitively.

25. A device for deploying a process for guiding a mobile craft, in a horizontal plane in order to capture and follow a trajectory defined in said horizontal plane and formed of adjacent segments, the device performing the following operational steps:
(a) determining a guidance segment from among said adjacent segments of said trajectory with respect to which said mobile craft is to be guided;
(b) determining a distance xtk between said mobile craft and a point of orthogonal projection of said mobile craft on the guidance segment determined in operational step (a);
(c) determining an angle tkae between an actual direction of travel ($\vec{E}$) of said mobile craft and a fictitious direction of travel ($\vec{F}$) which said mobile craft would have if said mobile craft were located at said point of orthogonal projection along said trajectory;
(d) computing a control value Φc for a lateral attitude of the mobile craft from a relation Φc=Φnom+((k1·xtk)+tkae)·k2 in which:
k1 and k2 represent characteristic coefficients,
Φnom represents a nominal value corresponding to the lateral attitude which said mobile craft is required to have in order to follow said guidance segment, and
k1·xtk is restricted between two predefined values; and
(e) applying the control value Φc computed in operational step (d) to said mobile craft to control the lateral attitude;
wherein, in order to determine a progressive value to be applied to said mobile craft in accordance with the computed control value Φc:
said computed control value is restricted to obtain a restricted control value;
a second derivative with respect to time of said restricted value is computed;
said second derivative is restricted to obtain a restricted second derivative; and
a double integration with respect to time of said restricted second derivative is performed so as to obtain said progressive value;
said device comprising:
a first computing unit for determining the current guidance segment, the first computing unit comprising:
a first computer for determining the distance xtk, and a second computer for determining the angle tkae;

a second computing unit connected to said first computing unit for computing the control value Φc of the lateral attitude; and an auxiliary computing means for determining, from the computed control value Φc, according to an at least second degree law of variation, the progressive value to be applied to the control of the lateral attitude of the mobile craft.

26. The device as claimed in claim 25, wherein the mobile craft is an aircraft.

27. The device as claimed in claim 25, wherein the adjacent segments comprise straight segments, circular arc-shaped segments, or both straight and circular arc-shaped segments.

28. The device as claimed in claim 25, wherein operational steps (a)–(e) are performed repetitively.

* * * * *